US010044785B2

(12) United States Patent
Ducat et al.

(10) Patent No.: US 10,044,785 B2
(45) Date of Patent: Aug. 7, 2018

(54) CONTROLLING A GRAPHICAL USER INTERFACE

(71) Applicant: Amadeus S.A.S., Biot (FR)

(72) Inventors: Fabien Ducat, Antibes (FR); Vincent Giovannini, Vallauris (FR); Florent Exbrayat, Valbonne (FR); Christophe Attias, Fontaines Saint Martin (FR); Cristos Stasinos, Juan les Pins (FR)

(73) Assignee: AMADEUS S.A.S., Biot (FR)

( * ) Notice: Subject to any disclaimer, the term of this patent is extended or adjusted under 35 U.S.C. 154(b) by 674 days.

(21) Appl. No.: 14/528,281

(22) Filed: Oct. 30, 2014

(65) Prior Publication Data

US 2016/0124917 A1    May 5, 2016

(51) Int. Cl.
G06F 3/0484     (2013.01)
H04L 29/08      (2006.01)
G06F 9/451      (2018.01)
G06F 3/0489     (2013.01)
G06F 9/44       (2018.01)
G06F 8/38       (2018.01)

(52) U.S. Cl.
CPC .......... *H04L 67/02* (2013.01); *G06F 3/0484* (2013.01); *G06F 3/0489* (2013.01); *G06F 8/38* (2013.01); *G06F 9/4443* (2013.01); *G06F 9/451* (2018.02)

(58) Field of Classification Search
CPC ..... G06F 17/2247; G06F 3/0484; H04L 67/02
See application file for complete search history.

(56) References Cited

U.S. PATENT DOCUMENTS

| 7,735,023 B1 | 6/2010 | Chadzelek et al. |
| 2002/0010715 A1* | 1/2002 | Chinn .................. G06F 3/16 715/236 |
| 2006/0064649 A1 | 3/2006 | Weber et al. |
| 2007/0005220 A1* | 1/2007 | Parikh .............. G06F 17/30899 701/100 |

(Continued)

FOREIGN PATENT DOCUMENTS

| AU | 2008261147 A1 | 7/2010 |
| EP | 2081108 | 7/2009 |

(Continued)

OTHER PUBLICATIONS

International Searching Authority, International Search Report and Written Opinion issued in corresponding Application No. PCT/EP2015/002058, dated Jan. 25, 2016, 11 pages.

(Continued)

*Primary Examiner* — Anil Bhargava
(74) *Attorney, Agent, or Firm* — Thompson Hine LLP

(57) ABSTRACT

A graphical user interface (GUI) definition document such as an HTML document incorporates one or more navigation data sets that define a navigation policy for various navigable elements in a graphical user interface. The navigation data sets are generally associated with navigable elements and specify other navigable elements to be navigated to in response to associated navigation events such that, whenever a particular navigable element is active and a particular navigation event is received, a navigation data set associated with both the particular navigable element and navigation event may be accessed to determine another navigable element to be activated in response to the navigation event.

20 Claims, 4 Drawing Sheets

(56) References Cited

U.S. PATENT DOCUMENTS

| | | |
|---|---|---|
| 2011/0113364 A1* | 5/2011 | Neil .................. G06F 3/0482 715/802 |
| 2012/0293516 A1 | 11/2012 | Look et al. |
| 2013/0311929 A1 | 11/2013 | Hughes et al. |

FOREIGN PATENT DOCUMENTS

| | | |
|---|---|---|
| WO | 2001095095 A2 | 12/2001 |
| WO | 2011054072 A1 | 5/2011 |

OTHER PUBLICATIONS

European Patent Office, European Search Report and Written Opinion issued in corresponding Application No. 14003668.2 dated Apr. 24, 2015, 6 pages.

* cited by examiner

CONTROLLING A GRAPHICAL USER INTERFACE

FIELD OF THE INVENTION

The invention generally relates to a graphical user interfaces, and in particular, to devices and computer software implementing graphical user interfaces.

BACKGROUND OF THE INVENTION

A graphical user interface (GUI) is a user interface allowing the user to interact with an electronic device. A GUI generally has a set of (graphical) elements for a user to interact with. For example, such elements may represent buttons, input fields, check boxes, icons, text fields, etc.

Difficulties may appear, however, whenever a user desires to navigate through a GUI, e.g., when navigating from one element of the GUI to another. It is desirable for such navigation to be as intuitive as possible to simplify the usage of the GUI. However, from the perspective of a developer of the GUI, it is also desirable to implement the navigation through the GUI within the electronic device with as little effort as possible. Furthermore, designing and/or adapting a GUI for different devices and/or different tasks often demands high flexibility as well as comfortable maintenance of the underlying navigation mechanism of the GUI. Moreover, it is generally desirable for the GUI and, in particular, its underlying navigation mechanism to use as few resources of the electronic device as possible. Further complicating matters is the need to support interaction both using a keyboard and using a pointing device such as a mouse.

Therefore, a continuing need exists in the art for improving user navigation through a GUI, particularly with respect to developing, implementing and/or controlling the GUI of an electronic device.

SUMMARY OF THE INVENTION

The invention addresses these and other issues associated with the art by utilizing a definition document such as an HTML document that incorporates one or more navigation data sets that define a navigation policy for various navigable elements in a graphical user interface (GUI). The navigation data sets are generally associated with navigable elements and specify navigable elements to be navigated to in response to associated navigation events such that, whenever a particular navigable element is active and a particular navigation event is received, a navigation data set associated with both the particular navigable element and navigation event may be accessed to determine another navigable element to be activated in response to the navigation event.

Therefore, according to one aspect of the invention, a graphical user interface (GUI) of an electronic device may be controlled by rendering a GUI defined by a GUI definition document. The GUI definition document may define a layout of a plurality of navigable elements, at least one navigation event, and at least one navigation data set per navigable element among the plurality of navigable elements, and a navigation data set for a respective navigation event of the at least one navigation event may specify a next one of the plurality of navigable elements to be navigated to in response to the respective navigation event. Navigation may occur from a current navigable element from among the plurality of navigable elements to a next navigable element among the plurality of navigable elements by receiving a received navigation event and, in response to the received navigation event, determining the next navigable element based on the at least one navigation data set of the current navigable element and setting the current navigable element as inactive and the next navigable element as active for user interaction.

According to another aspect of the invention, a graphical user interface (GUI) definition document for use in rendering a GUI may be generated for display on an electronic device. The GUI definition document may define a layout of a plurality of navigable elements, at least one navigation event, and at least one navigation data set per navigable element among the plurality of navigable elements, and a navigation data set for a respective navigation event of the at least one navigation event may specify a next one of the plurality of navigable elements to be navigated to in response to the respective navigation event. The GUI definition document may be communicated to the electronic device such that when the electronic device renders the GUI definition document, the GUI definition document causes the electronic device to navigate from a current navigable element from among the plurality of navigable elements to a next navigable element among the plurality of navigable elements in response to a received navigation event by determining the next navigable element based on the at least one navigation data set of the current navigable element and setting the current navigable element as inactive and the next navigable element as active for user interaction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
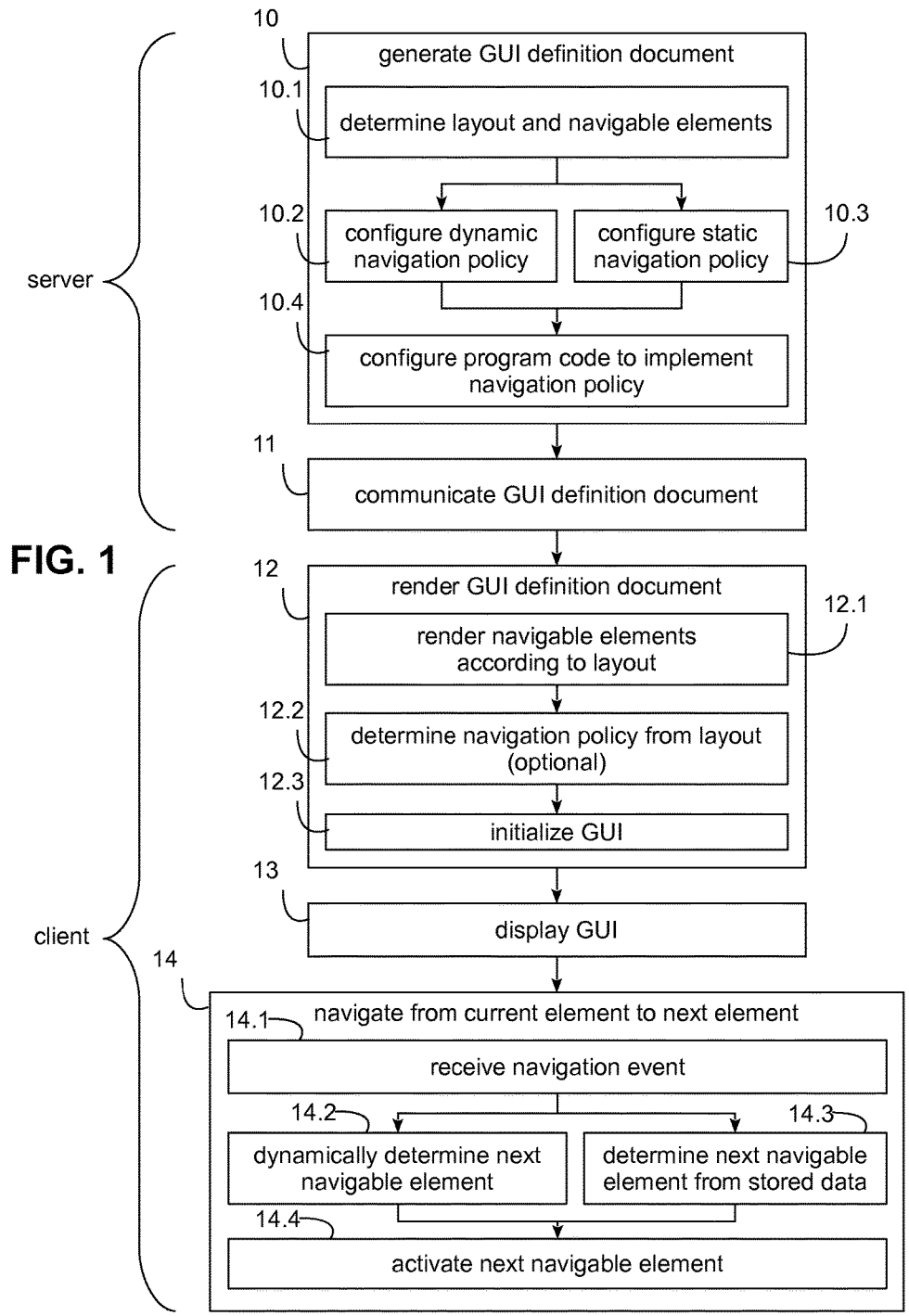
FIG. 1 is a flow diagram of a method of controlling a GUI.

Embodiments consistent with the invention support user navigation in a graphical user interface (GUI) by utilizing a GUI definition document such as an HTML document that incorporates one or more navigation data sets defining a navigation policy for various navigable elements in the GUI. The navigation data sets are generally associated with navigable elements and specify navigable elements to be navigated to in response to associated navigation events such that, whenever a particular navigable element is active and a particular navigation event is received, a navigation data set associated with both the particular navigable element and navigation event may be accessed to determine another navigable element to be activated in response to the navigation event.

As noted above, the GUI is defined by the GUI definition document. The GUI definition document generally includes definitions of the layout of the GUI, definitions of the navigable elements of the GUI, definitions of at least one navigation event and definitions of the at least one navigation data set per navigable element. In some embodiments, on the basis of only a single document the GUI definition document at least defines the appearance of the GUI as well as the GUI's behavior with regard to navigation through the GUI in terms of the layout, navigable elements, navigation event(s) and navigation data sets. Defining both the layout and the navigation mechanisms of the GUI in a single GUI definition document (although this may include various files) generally reduces the effort for developing GUIs and/or allows a more compact, resource-friendly definition of the GUI.

Since the GUI definition document in some embodiments includes the definition of the layout and the definitions of the navigable elements, the electronic device may, in such embodiments, render the GUI to display it for a user of the device as well as provide the navigation functionality of the GUI based on a single document, namely the GUI definition document.

For efficient processing and storage of the GUI definition document and/or for improved data communication, e.g. for transmitting the GUI definition document from the server to the client, in some embodiments the GUI definition document may be represented by a single file. Alternatively, e.g. for improving data separation, in some embodiments the GUI definition document may be represented by multiple files, which together build up the GUI definition document.

The electronic device may be of any type including, for example, desktop computers, laptops, tablet computers, smartphones, TVs, game consoles, car navigation devices, car entertainment devices, etc. In some embodiments the electronic device is equipped with a keyboard. A navigation event may be received in response to pressing a key or a combination of keys of the keyboard.

In some embodiments the electronic device has a display for displaying the rendered GUI. Put another way, a view of the GUI may be rendered according to the layout of the GUI and displayed on the display.

In some embodiments the electronic device is a client which is arranged to receive the GUI definition document from a server. In some embodiments the client and the server are members of a system, which is configured to carry out the methods described herein. The client and the server may be connected by wire and/or wireless technology, for example via an Internet or intranet connection.

In some embodiments the GUI definition document defines at least two layouts. This enables the client to select one of the multiple layouts when rendering the GUI, e.g., when switching between different layouts. For example, different layouts may define different color schemes, different sizes of the navigable elements, different languages for text to be rendered in the view of the GUI. For example, a first layout may be designated for displaying the GUI on a display of a stationary device, e.g. a personal computer display, and a second layout may be designated for displaying the GUI on a display of a mobile device, e.g. a laptop computer display, a tablet computer display and/or a mobile phone display. For providing identical navigational behavior of the GUI independent from the respective layout, in some embodiments each layout incorporates all, the same set or the same subset of the navigable elements defined in the GUI definition document. Alternatively, to provide different navigational behaviors of the GUI, in some other embodiments a first layout incorporates a first set of navigable elements and a second layout incorporates a second set of navigable elements, wherein the first and second set may be disjunctive.

The navigation data sets contribute to the navigational behavior of the GUI. A navigation data set includes at least two pieces of information: it specifies a navigable element to be navigated to in response to a particular navigation event. Thus, a navigation data set builds an interrelation between a respective navigation event and a navigable element, and, thus, a navigation data set associates a navigable element with a particular navigation event for a respective navigable element. A navigation data set may be understood in some embodiments as a property of a particular navigable element. For example, navigation data sets of different navigable elements may associate different navigable elements with the same navigation event and/or associate different navigation events with the same navigable element.

A particular navigable element specified by a particular navigation data set is the next navigable element out of the GUI's navigable elements to be navigated to in response to the respective navigation event specified by this navigation data set. Hence, since navigation data sets in some embodiments are considered to belong to their respective navigable elements, the at least one navigation data set of a particular navigable element may define for its particular navigable element the next navigable element(s), which succeed(s) the particular navigable element in dependency of the associated navigation event when navigating through the GUI.

For better understanding navigating within the navigable elements of the GUI, an exemplary navigation activity for navigating from one navigable element to a next navigable element may be described in detail:

Assuming as a start point for the exemplary navigation activity a particular one of the GUI's navigable elements being actually set as active. This navigable element, which is actually set as active, is referred to as current navigable element herein. Furthermore, if not explicitly otherwise mentioned, the term "element" is to be understood as a "navigable element" herein; hence, the expression "current element" is to be understood as "current navigable element", for example. Examples of a navigable element of the GUI are buttons, tables, table columns, table lines and table cells, text fields, checkboxes, lists with selectable entries, radio buttons, scrollbars, exit icons, drop-down menus and other menu elements, windows, pop-up windows, etc.

Turning back to the exemplary navigation activity, for example in response to a user input, a particular navigation event (being defined and/or handled in the GUI definition document) may be received. In response to the receipt of the navigation event, this received navigation event may be taken as a basis for deciding which of the GUI's navigable elements becomes the target of the exemplary navigation activity ("next navigable element" herein), i.e. a successor element of the current element. Because of the current element (still) being the start point, the decision may be based on the navigation data set(s) of this (current) element. In dependency of the received navigation element, that element of the GUI definition document may be determined as the next element, which is associated with the particular navigation event according to the current element's navigation data sets. In other words, the current element "knows" (by its navigation data sets) about all possible candidate successive elements in dependency of respective navigation event(s).

Thereupon, the current navigable element may be set as inactive and the so determined next navigable element may be set as active. The next navigable element, which was the target of the navigation so far, then becomes the (new) current navigable element and, thereby, becomes the new start point for a further navigation activity through the GUI.

Thus, navigation through the GUI works in a stepwise manner of, figuratively expressed, hopping from one element to a next one by such navigation activities.

Thus, the navigational behavior of the GUI may be defined at least in part by the navigation data sets in so far that they individually define for each element respective successive (next) elements in dependency of (different possible) navigation events. As to navigation, the navigation events may trigger navigating between navigable elements, wherein each element defines by its navigation data sets the possible next navigable element to be navigated to in response to and in dependency of the navigation events. In other words, the navigation data sets may be understood as navigation rules defining for its respective navigable element respective next navigable elements in dependency of the received navigation event. Each navigation data set of a particular navigable element may in some embodiments be considered unique with regard to a respective navigation event.

The GUI definition document may include further navigation rules (in addition to the navigation data sets), for example navigation rules for controlling (e.g. switching between different) navigation areas (which are described below), rules for error handling and/or rules for exception handling.

The navigation rules defined in the GUI definition document may follow a navigation policy for the GUI. Navigation policies may describe the navigational behavior of the GUI. It might be desirable that the GUI provides different navigational behaviors, for example in dependency of a keyboard, a display and/or a device type, the GUI may be navigable through different sets of keys, e.g. either by cursor or arrow keys or by character generating keys or by function keys (F1, F2 and so on). Therefore, in some embodiments the GUI definition document may include different navigation policies, i.e. at least two policies.

As to navigation policies as such, a navigation policy may be an arbitrary navigation policy in some embodiments. An arbitrary navigation policy explicitly defines for a navigable element its respective next navigable elements. This gives the developer of the GUI a high degree of customization with regard to the navigational behavior of the GUI, since for a navigable element the possible next navigable elements can be individually defined in the GUI.

In some embodiments, a navigation policy may be a nearest neighbor navigation policy. Nearest neighbor navigation policy means that for a navigable element its next navigable elements are nearest neighbor navigable elements with regard to the rendered view of the GUI. Thus, in a nearest neighbor navigation policy the next navigable elements are determined by the spatial relation (in particular the position and size) of the navigable elements within the rendered view of the GUI. Nearest neighbor navigation policies may account for horizontal and/or vertical navigation, e.g. by navigating to a nearest neighbor navigable element (starting from the current element) in a horizontal and/or vertical direction in response to navigation events, e.g. associated with horizontal cursor keys (LEFT, RIGHT) and/or vertical cursor keys (UP, DOWN).

It might be desirable that the GUI is applicable independent from a specific hardware, firmware and/or operating system of the electronic device. Therefore, in some embodiments, the GUI definition document comprises a hypertext markup language document defining the layout of the GUI, for example an HTML document or XHTML document (HTML and XHTML are jointly referred to as "HTML" herein). In some embodiments, navigation rules are implemented by HTML code (e.g. as HTML objects and/or as attributes of HTML objects), JavaScript code and/or PHP code.

In some embodiments, navigation data sets are statically defined in the GUI definition document. For example, navigation data sets may be defined as one or more data array, as one or more tables and/or as HTML attributes of the HTML elements representing navigable elements. Thus, in these embodiments navigation rules can be manually set in the GUI definition document, e.g. in accordance with an arbitrary navigation policy.

In some embodiments, navigation rules are generated by program code (e.g. defined in the GUI definition document itself or by a navigation-policy implementing engine located either at the server-side or at the client-side) based on properties of the navigable elements and/or the layout of the GUI. Such navigation rules as well as their associated navigation policy can be understood as dynamic ones. In such dynamic navigation policies the next navigable element for a particular current navigable element may be determined by program code, e.g. JavaScript or PHP, in dependency from respective navigation events.

In some embodiments, the nearest neighbor navigation policy is a dynamic policy in that the next navigable elements are determined by program code analyzing a spatial relation between the current navigable element and surrounding navigable elements within the rendered view of the GUI. The program code determines in response to navigation events associated with cursor keys (like UP, DOWN, LEFT, RIGHT) the nearest neighbored navigable element in the respective (up, down, left or right) direction as next element. In such embodiments, the next navigable element can be automatically determined for a current navigable element by the program code. In some embodiments, up, down, left and right arrow navigation events may be used to trigger navigation to next navigable elements defined in up, down, left and right navigation data sets for a particular navigable element.

As the navigation events may be generated based on keyboard events only, navigating through the GUI can be performed fully without a mouse and the GUI may be implemented in mouseless environments such as a mouseless electronic device. This allows quickly navigating through the GUI, since the user does not require to switch between a keyboard and a mouse. This becomes in particular relevant with the GUI being implemented in e.g. HTML and processed by a web browser, since web browsers and/or HTML provide little functionality with regard to navigating through HTML elements using a keyboard. In some embodiments, the electronic device is pointing-device-less. However, in some embodiments a mouse or another pointing device may be optionally used for navigating within the GUI as described later.

As described before, navigating to the next navigable element includes setting this (next) navigable element as active. This also includes setting as inactive the element previously set as active, or all (remaining) other navigable elements of the GUI in some embodiments. Therefore, the method of controlling the GUI may include precautionary measures to ensure that only a single one of the navigable elements is set as active in any point in time at the most. Setting a navigable element as active means in some embodiments that user input may be passed to the element being set as active, whereas user input may not be passed to elements being not set as active (i.e. set as inactive). The user may interact with the navigable element set as active, for example entering text into a text input element, selecting or deselecting a check box element or pushing a button, e.g. by typing "Enter" and/or "Space" keys on the keyboard.

For guiding the user to the current element, in some embodiments navigating to the next element includes (graphically) emphasizing the next element (as it becomes the current element), e.g. in response to setting it as active. In some embodiments, setting a particular element as inactive is accompanied by (graphically) deemphasizing this particular element. For example, a navigable element may be only emphasized if it is set as active. Thus, in some embodiments only a single one of the navigable elements is emphasized at any point in time at the most. In some embodiments, (graphically) emphasizing an element includes rendering the emphasized element with a different color, with an additional shadow, with an additional border and/or with a bolder border or text as compared to when it is not emphasized.

For mouseless or pointing-device-less navigating through the GUI, i.e. without the necessity of using a pointing device like a mouse, a trackball or touch screen functionality, in some embodiments the navigation event can be a key code from the keyboard and/or a character code from a user input. In some embodiments, a keyboard event itself and/or an input event itself may be considered as a navigation event. In some embodiments navigation events are based on keyboard events and/or input events only, which means that either the method of controlling the GUI or the electronic device, e.g. an operating system of the client or an application, such as a web browser, processed by the device, generate a navigation event in response to a keyboard event and/or input event.

For example, a navigation event may be received by the method of controlling the GUI in response to a cursor key (e.g., "Up", "Down" "Left", "Right", "Tab", "PageUp", "PageDown", "Home", "End", etc.), a character generating key (e.g. such as "A" through "Z", "0" through "9", "Space", etc.) or a modifier key (e.g. such as "Shift", "Alt" or "Ctrl") and/or any combination thereof being pressed on the keyboard. Hence, the present approach of defining the navigation events leading the user from the current to a next navigable element of the GUI allows a great navigation flexibility, a more universal navigation and, thus, improves the usability and operability of the electronic device.

A key code may be a number named code that codes which keys or combination of keys of the keyboard were affected, e.g. by a user typing on the keyboard. The key code may further code in what manner the key(s) were affected: the key code may code whether a key was pressed down or released. In some embodiments a navigation event is received in response to pressing at least one key down and/or releasing a key of the keyboard. In some embodiments navigation events are repeatedly received during at least one key being continuously held down. In other words, holding a key down for some time will result in firing navigation events one after another. In some embodiments, for example, "Key Down", "Key Pressed", and "Key Up" events may be detectable.

A character code may be generated when a user input yields a character. For example, a character code may be generated on typing a character generating key of the keyboard. The character code gives an ASCII value of the character, for example. Character code and key code are not necessarily the same; for instance, a lower case "a" and an upper case "A" may have the same key code, because the user presses the same key "A" on the keyboard, but a different character code because the resulting character is different. Moreover, an upper case "A" having a particular character code may be generated by typing the key "A" either in combination with the left "Shift" key or the right "Shift" key of the keyboard, which is coded by different key codes identifying whether the left or the right "Shift" key was involved. Correspondingly, in some embodiments, the key code may also code a status of modifier keys in addition to character generating keys.

Navigation events may include or consist of a unique navigation event identifier that allows to identify and/or distinguish different navigation events by the method of controlling the GUI. For example, the unique navigation identifier may include a sequential number or the unique navigation identifier may include or consist of the key code and/or the character code. Navigation events may correspond to any code of any subset of all the keyboard available key codes and/or of any subset of all the character codes supported by the electronic device.

In some embodiments, the method of controlling the GUI involves a filter for selecting only specific events out of the possible keyboard events and/or input events. For example, this allows for generating navigation events only in response to the user pressing a particular subset of the available keys. For example, navigation events may only generated in response to cursor keys and/or a "Tab"-key or a combination of those keys, optionally in combination with particular ones of modifier keys. This further allows that no navigation event is generated in response to keyboard events and/or input events which correspond with certain keys (e.g. such as character generating keys).

For not disturbing other tasks of the electronic device, in some embodiments events (such as keyboard events and/or input events) may be passed back (to the device, the device's operating system or an event handler within the device). However, e.g. to avoid unforeseen interferences with other tasks of the device, in some embodiments those events in response to which a navigation events have been generated may be withheld from the client, i.e., they are not passed back to the device itself.

In some embodiments mouse events, touch events from a touch screen and/or other pointing device events (collectively referred to herein as click events) may be interpreted by the method of controlling the GUI in order to update the current navigable element. For example, that navigable element of the GUI, which covers (within the rendered view of the GUI) a mouse cursor position, a touch position or a pointing device position (e.g. coded within the respective event), may become the (new) current navigable element. This may include setting this element as active and/or emphasizing this element.

In some embodiments the GUI definition document defines at least 2, 4 or 6 navigation data sets per navigable element, wherein each navigation data set within the data sets of a particular navigable element is unique with regard to its associated navigation event. Thus, each navigable element is sensitive for exactly the number of different navigation events according to the number of its navigation data sets. A navigable element having a number n of navigation data sets is sensitive for n different navigation events.

For particular elements it may be desirable that two or more navigation events may cause navigating from this particular element as current element to the same next element. For example, in the case of navigating within navigable elements being arranged in a column within the rendered view of the GUI, it may be desirable that pressing the arrow keys "left" and "up" may navigate into the same (upward) direction, i.e. to the same upward positioned next element. Therefore, for a particular navigable element, in some embodiments the number of different next elements specified in its navigation data sets may be less than the number of navigation data sets, because at least two different navigation data sets specify the same navigable elements as next element.

For uniquely identifying each of the navigable elements, in some embodiments the GUI definition document defines a unique navigable element identifier (unique ID) for each navigable element.

In some embodiments each navigable element is addressed by its respective unique ID. In some embodiments the navigation data set includes the unique ID of the next navigable element to specify this element to be navigated to in response to a respective navigation event. For keeping track when navigating through the GUI, in some embodiments a current navigable element identifier (current ID) is maintained. The current ID corresponds to the unique ID of the current navigable element. As to navigating from the current navigable element to the next navigable element, in some embodiments the current ID is set to the value of the unique ID of the next navigable element when navigating to the next navigable element.

In some embodiments, the GUI definition documents define other elements than navigable elements. For example, navigable elements and (per se) non-navigable elements may be differ at least in that that for a navigable elements a unique ID is defined in the GUI definition document, whereas for a non-navigable elements the GUI definition documents lacks a unique ID. Thus, the presence of a unique ID within a particular element defines whether this particular element is a navigable element or a non-navigable element. It is to be noted that in this particular paragraph the term "element" does not equals the "navigable element". Furthermore, it is to be noted that non-navigable elements may still be responsive to user input and/or be activated/emphasized in response to other types of events, so some embodiments support navigation as disclosed herein for only a subset of the elements rendered in a given GUI.

In some embodiment the electronic device initializes the GUI, e.g. before rendering and/or displaying the GUI for the first time and/or before receiving any user input and/or events. To define a start point for navigating through the GUI, in some embodiments the GUI definition document defines a start identifier (start ID), which corresponds to the unique ID of a particular one of the navigable elements. For example, initializing the GUI may include setting the current ID to the value of the start ID as defined in the GUI definition document. Thus, on initializing the GUI a particular one of the elements may be set as current navigable element, i.e. as an initial start point of the navigation. The start point may be emphasized, for example.

In some embodiments the GUI definition document defines at least one navigable element to be hidden, i.e. to be not visible by a user when rendering the GUI. In some embodiments, the GUI definition document defines a hidden-property of a respective navigable element. In some embodiments, the hidden-property of a respective navigable element may be included within the definition of the respective navigable element. For example, the hidden-property may be implemented as an HTML attribute of a navigable element defined as HTML element. In some embodiments, the hidden-property may be defined separate from the definition of the navigable element within the GUI definition document. For example, the GUI definition document defines a list including the at least one navigable element to be hidden, wherein the mere fact that a particular element is included in the list means that it is to be hidden. In some embodiments, the GUI definition document includes a table specifying for the at least one navigable element to be hidden or for all navigable elements respective hidden-attributes, which specify whether a respective element is currently to be hidden or not. At least one navigable element or each navigable element defined in the GUI definition document may have a hidden-property. Respective elements may not be rendered if their hidden-property is set as active; otherwise, if the hidden-property is set as inactive, the respective element may be rendered when rendering the GUI. In some embodiments, the hidden-properties may be toggled by the electronic device, for example for temporally hiding and/or showing the respective navigable elements (in the rendered view of the GUI) by setting the hidden-property as active and inactive respectively.

In some embodiments the GUI definition document defines at least one navigable element to be disabled. Being disabled means that a respective navigable element is prohibited from being set as current element with regard to navigating through the GUI. In some embodiments, the GUI definition document defines a disabled-property of a respective navigable element. In some embodiments, the disabled-property of a respective navigable element may be included within the definition of the respective navigable element. For example, the disabled-property may be implemented as HTML-attribute of a navigable element defined as HTML element. In some embodiments, the disabled-property may be defined separate from the definition of the navigable element within the GUI definition document. For example, the GUI definition document defines a list including the at least one navigable element to be disabled, wherein the mere fact that a particular element is included in the list means that it is to be disabled. In some embodiments, the GUI definition document includes a table specifying for the at least one navigable element to be disabled or for all navigable elements respective disabled-attributes, which specify whether a respective element is currently to be disabled or not. At least one navigable element or each navigable element defined in the GUI definition document may have a disabled-property. Disabled-properties can be toggled by the electronic device, for example. When navigating to an element with its disabled-property set as active (i.e. being a disabled element), then the disabled element is bypassed and automatically the next element from the perspective of the disabled element is set as current element, for example. However, this requires a careful design and control of the GUI, since this may result in an endless loop. The disabled-property may be toggled by the electronic device, for example to temporally prevent the user from navigating to the disabled element or to allow navigating to this element (if the disabled-property is set inactive).

In some embodiments, navigable elements to be hidden and/or to be disabled may be specified by a single attribute of a respective navigable element or a single entry in a table defined in the GUI definition document. For example, the hidden-property and the disabled-property may be combined into a single (multi-state) signal, which indicates whether a respective navigable element is hidden, is disabled or neither hidden nor disabled. In other examples, such signal may indicate whether a respective navigable element is hidden, is disabled, is hidden and disable or is neither hidden nor disabled.

In some embodiments, the GUI definition document may include an HTML document and may define the navigable elements as HTML elements. HTML documents and elements can be interpreted by a web browser to render a view of the HTML document (web page), i.e. to render the GUI. Web browsers are available on multiple kinds of electronic devices, which allows the GUI to be implemented on such devices. Using web architecture and the GUI being defined using HTML enables in some embodiments that the methods described herein are implemented on a client side, a server side, or on both sides.

In some embodiments, navigating from the current navigable element to the next navigable element is carried out by JavaScript by a web browser processed by the electronic device. JavaScript offers an event based system which triggers events when necessary so that the browser can catch them and react dynamically. This applies to keyboard events and input events. This allows that in some embodiments the method of controlling the GUI, and in particular the navigation within the GUI, is implemented fully by HTML in combination with JavaScript, e.g., JavaScript embedded within an HTML document itself.

Thus, those embodiments address the increasing popularity of web-oriented GUI interfaces used in a number of functional areas. For example, in HTML 4.01 an element generally must receive focus from the user in order to become active and perform its tasks. For example, users generally must activate a link specified by the HTML "A" (anchor) element in order to follow the specified link. Similarly, users generally must give a TEXTAREA focus in order to enter text into it.

In some applications, it may be desirable for a user to give focus to an element by navigating from one element to the next with the keyboard, rather than using a mouse or other pointing device. For example, in some industries such as the travel industry that rely heavily on keyboard input, it may be desirable to reduce how often a user has to switch between using a keyboard and using a mouse when interacting with a web-oriented GUI interface.

Conventional web browsers, however, support only limited keyboard navigation, and generally only permit a user to navigate between elements using a "Tab" key. The HTML standard, for example, permits an HTML document's author to define a tabbing order that specifies the order in which elements will receive focus if the user navigates through the document with the "Tab" key. Once selected, an element may then be activated by some other key sequence. In addition, a "Shift-Tab" key combination may be supported to sequence through elements in a reverse order from the "Tab" key alone.

In particular, in HTML 4.01, tabbing navigation is based on attribute definitions "tabindex=positive number". This attribute specifies the position of a respective element in the tabbing order for a particular document. Elements that may receive focus may be navigated by user agents according to the following rules: 1) Those elements that support the tabindex attribute and assign a positive value to it are generally navigated to first. Navigation proceeds from the element with the lowest tabindex value to the element with the highest value. Values need not be sequential nor must they begin with any particular value. Elements that have identical tabindex values are generally navigated to in the order they appear in the character stream. 2) Those elements that do not support the tabindex attribute or support it and assign it a value of 0 are generally navigated to next. These elements are generally navigated in the order they appear in the character stream. 3) Elements that are disabled generally do not participate in the tabbing order. According to HTML 4.01, the following elements support the tabindex attribute: A, AREA, BUTTON, INPUT, OBJECT, SELECT, and TEXTAREA.

Thus, standard HTML is generally very limited with regard to navigating through HTML elements within a web page. HTML natively supports only switching from one input element to another using "Tab" and "Shift"+"Tab" keys. Without any specification, the order of this navigation is naturally chosen by the browser according to the order of appearance of the HTML elements within the HTML document. This order can be altered by a so-called tab-index mechanism, wherein an HTML element has a tab-index-property, which is a sequential numbering representing a ranking of the HTML elements. Hence, the tab-index-mechanism allow for linear navigation according to this ranking. However, a particular HTML element does not know about its respective neighboring elements, since it just knows it's (ranking) number of the tab-index.

Accordingly, in contrast to heavy client server architectures where full access is provided to the operating system APIs and resources (including keyboard navigation functionality) light weight web-oriented client server architectures are generally more limited in functionality, as the navigation capabilities are limited to those described into a browser, and only based on browser API's and resources, wrapping some operation system functionalities. This may lead to multiple technical issues with respect to keyboard navigation within browsers.

Therefore, in some embodiments, HTML elements representing navigable elements of the GUI include HTML attributes representing at least one navigation data set of respective navigable element. This enables a web browser to render the GUI as well as control navigation through the GUI, since the HTML element includes the navigation information of the navigation data sets, which specify the next element to be navigated to in response to particular navigation events. For example, a single HTML attribute of a particular element may represent exactly one navigation data set or a single HTML attribute may represent all the navigation data sets of a particular element.

For example, with regard to a particular HTML element (representing a navigable element of the GUI) its HTML attributes representing the navigation data sets may be be accessed by JavaScript program code (e.g., a JavaScript event handler) to determine the next navigable element in response to a received navigation event. In some embodiments, the at least one navigation data set of a particular navigable element is defined by an HTML element or HTML object other than the HTML element representing the particular navigable element. In some embodiments, the totality of navigation data sets of all navigable elements may be defined by a single HTML element or a single HTML object. In some embodiments, navigation data sets are defined by program code, e.g. JavaScript program code and/or PHP program code, defined in the GUI definition document.

An HTML object can be emphasized or deemphasized as described above using JavaScript. Therefore, the GUI definition document may be an HTML document, optionally including appropriate JavaScript program code to carry out the above described methods. The GUI definition document may be a single (HTML) file or, alternatively, separated into multiple files.

In some embodiments HTML elements, which are not natively navigable by HTML, are defined as navigable elements in the GUI definition document. For example, in some embodiments HTML image resources are defined as navigable elements in the GUI definition document. Moreover, the GUI definition documents may define any possible HTML element as a navigable element, e.g. by adding navigation data sets as HTML attributes to the respective HTML element.

As already described, different layouts may be defined in the GUI definition document may allow for different appearances of the GUI. Alternatively or in addition thereto, some embodiments include a further mechanism allowing inter alia different appearances as well as different navigational behavior of the GUI: the GUI definition document may define at least two navigation areas, wherein for each of the at least two navigation areas the GUI definition document defines at least one layout being associated with the respective navigation area for rendering the GUI, navigable elements associated with the respective navigation area, and at least one navigation data set per navigable element.

Using navigation areas, navigation can be (temporally) restricted to a particular navigation area by selecting one of the at least two navigation areas, rendering the GUI according to the layout of the selected navigation area and navigating from the current navigable element to the next navigable element only within the navigable elements associated with the selected navigation area. This means that a navigation event is received and that in response to the received navigation event, the current navigable element of the selected navigation area is set as inactive and the next navigable element of the selected navigation area is set as active for user interaction, wherein the next navigable element being determined based on the at least one navigation data set of the current navigable element. Thus, each navigation area can have its own navigation policy or navigation policies.

In some embodiments, this mechanism of navigation areas is processed by the electronic device to generate multiple pages, multiple windows, at least one sub-window, at least one pop-up window or at least one display element of the (rendered instance of) GUI and/or to temporally restrict navigation to a sub-region of the (rendered instance of) GUI. A navigation area can include all the navigable elements of the GUI or a genuine subset of the GUI's navigable elements. One or multiple instances of both such kinds of navigation areas may simultaneously be defined in the GUI definition document. In some embodiments the GUI defines a first navigation area being a genuine subset of a second navigation area with regard to the navigable elements. However, in some other embodiments all the navigation areas defined in the GUI definition document build pairwise disjunctive subsets with regard to the GUI's navigable elements, wherein each navigable element is included in exactly one particular navigation area.

In some embodiments, the GUI definition document defines at least one navigation area control event. The GUI definition document may define different area control events, which may include a code for activating a particular one of the at least two navigation areas, a code for deactivating a navigation area and/or a code for switching between two navigation areas respectively. Correspondingly, in response to receiving a navigation area event, in some embodiments a navigation area is activated or deactivated respectively. Activating a navigation area may include rendering the GUI according to particular one of the at least one layout of the navigation area and navigating within the navigable elements of the navigation area as generally described above with regard to the GUI as such. Navigation area events may be generated as described with regard to navigation events herein. In some embodiments, a navigation event may be received in response to pressing a key or a combination of keys of the keyboard. A navigation area control event may be a key code and/or character code, for example.

In some embodiments, an apparatus, including at least one processor and program code configured upon execution by the at least one processor to perform any of the aforementioned methods, or a program product comprising a non-transitory computer readable medium and program code stored on the computer readable medium and configured upon execution by at least one processor to perform the any of the aforementioned methods, may also be provided.

Figure 2:
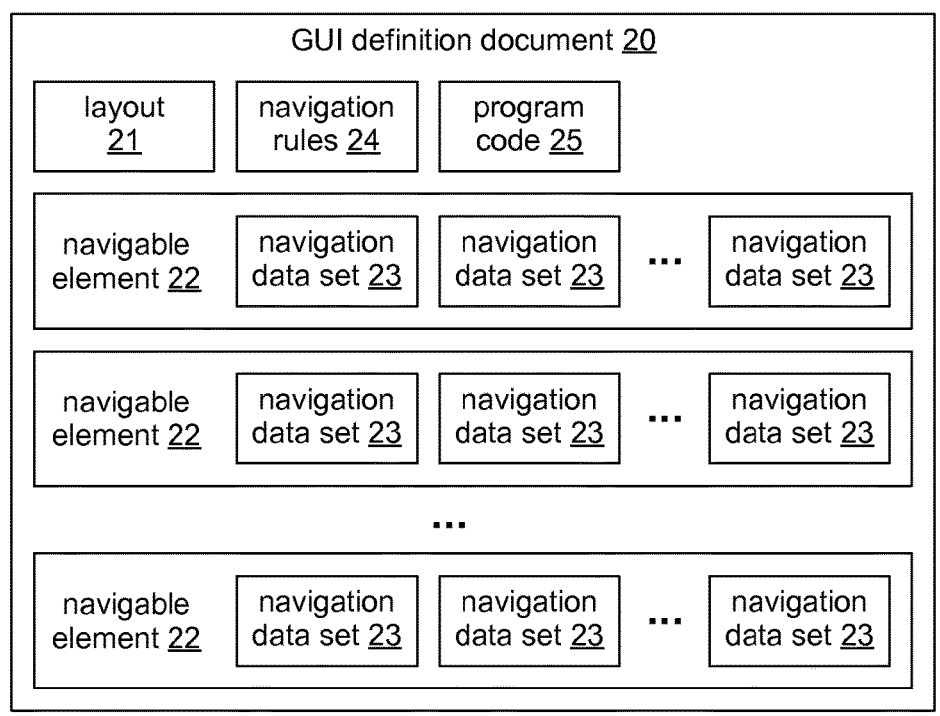
FIG. 2 is a block diagram of an example GUI definition document.
Figure 5:
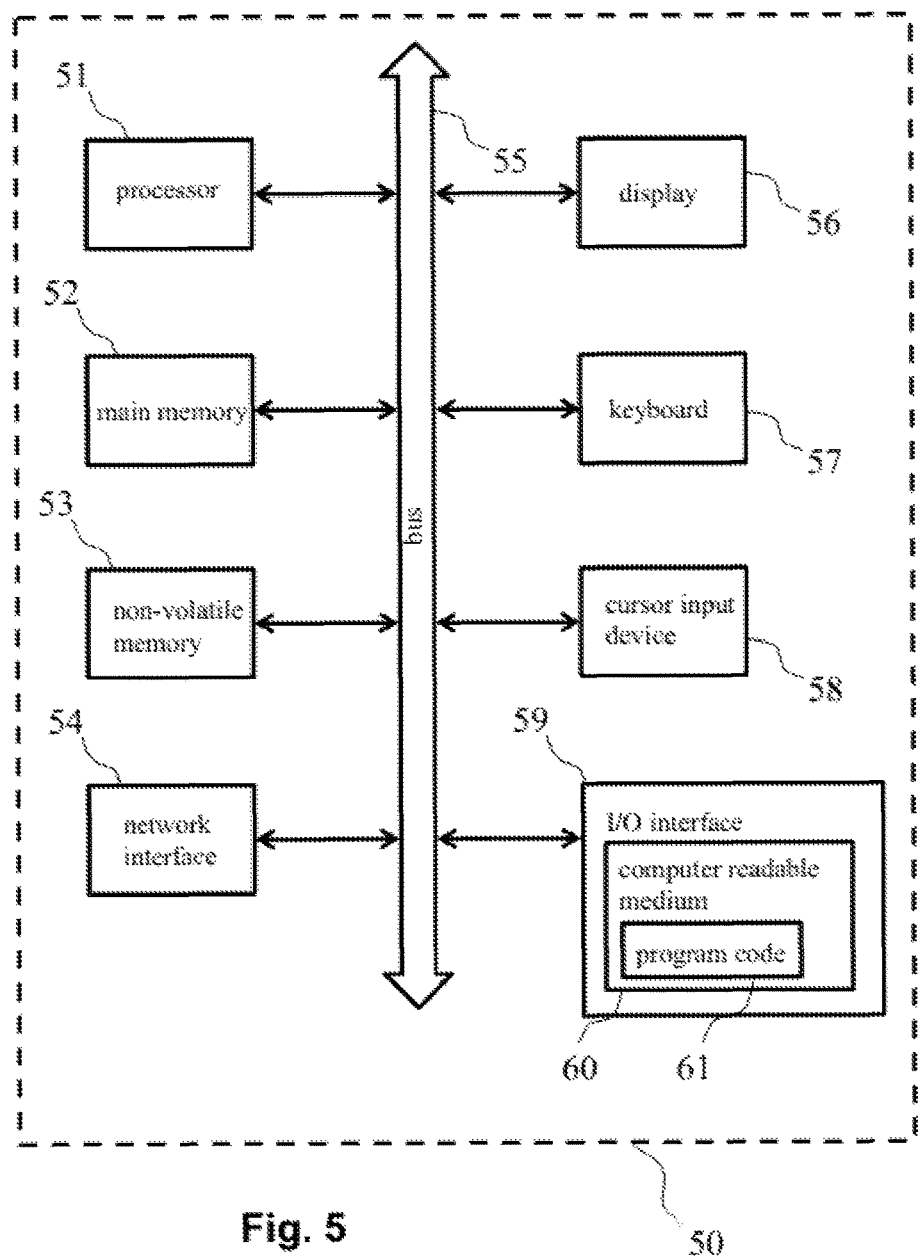
FIG. 5 is a block diagram illustrating an example electronic device and an example computer program product.

Turning now to the drawings, wherein like numbers denote like parts throughout the several views, FIG. 1 illustrates an example method of controlling a graphical user interface (GUI) of an electronic device 50 (see FIG. 5). The GUI is defined by an example GUI definition document 20 illustrated in FIG. 2. The GUI definition document 20 defines a layout 21 of the GUI for rendering the GUI by the electronic device 50. The GUI definition document 20 further defines multiple navigable elements 22 of the GUI. Each navigable element 22 includes (at least two) navigation data sets 23. A respective navigation data set 23 specifies a navigation event and a next navigable element 22 to be navigated to in response to receiving the navigation event. Thus, a particular navigation data set 23 is a particular one of multiple navigation rules defined by the GUI definition document 20 for navigating within the GUI. Navigation rules defined by navigation data sets 23 define for their corresponding navigable element 22 as a current navigable element a respective next navigable element 22 in dependency of the navigation event. Additional navigation rules 24, e.g., for switching between navigation areas, error handling, exception handling, etc. may also be included. In addition, program code 25 (e.g., JavaScript program code) may be incorporated in GUI definition document 20 to implement a navigation policy, as well as handle other interactive functionality associated with the GUI.

Turning back to FIG. 1, the operations associated with generating the GUI definition document and thereafter rendering and using the GUI definition document are illustrated in greater detail. As illustrated at 10, generation of the GUI definition document may be performed, for example, by a server, and may include operations 10.1-10.4 for determining the layout and navigable elements for the GUI (operation 10.1), configuring the navigation policy (operation 10.2 or 10.3) and configuring the program code to implement the navigation policy (operation 10.4).

Determination of the layout and navigable elements in operation 10.1 may be performed in a number of conventional manners associated with the generation of web-based content, e.g., based upon retrieval of one or more static HTML files, dynamic generation of HTML content, or a combination of the same. In addition, depending upon whether the navigation policy to be implemented is dynamic or static, one of operations 10.2 or 10.3 is performed to configuration the navigation policy.

As an example, if the navigation policy is a static policy implemented by a developer, the navigation data sets selected by the developer may be added as HTML attributes to the navigable elements in operation 10.3. Otherwise, if the navigation policy is dynamic, operation 10.2 may analyze the generated layout and determine the appropriate navigation data sets to be added as HTML attributes to the navigable elements, e.g., based on a nearest neighbor approach. In other embodiments, operations 10.2 and/or 10.3 may be omitted entirely, e.g., if a nearest neighbor policy is implemented in and analyzed by a client receiving the GUI definition document, or if the data sets are already encoded by a developer into the GUI definition document itself.

Configuration of the program code to implement the navigation policy in operation 10.4 may incorporate automated generation of one or more JavaScript routines, e.g., one or more JavaScript event handlers. In addition, in some embodiments, the navigation data sets or program logic effectively implementing navigation data sets may be programmatically incorporated into the program code. Additional program code may also be generated in operation 10.4, e.g., for incorporating other interactive functionality into the GUI. In other embodiments, operation 10.4 may be omitted, e.g., if the program code is hard coded into a static HTML file. Other operations associated with generating an HTML or other GUI definition document, but that are not associated with implementing a navigation policy, may also be performed, as will be appreciated by those of ordinary skill in the art.

After generation of the GUI definition document, the GUI definition document may be communicated from the server to the client, as illustrated by operation 11. In some embodiments, communication of the GUI definition document may occur immediately subsequent to generation of the GUI definition document, e.g., in the case of dynamically-generated web-based content that is generated specifically in response to client requests. In other embodiments, generation of the GUI definition document may occur well in advance of communicating the document, e.g., when a developer creates the GUI definition document for later uploading to a production web server. In this regard, it will be appreciated that generation of the GUI definition document need not be performed by the same device that initiates communication of the GUI definition document to a client.

Once received by a client, e.g., electronic device 50 of FIG. 5, the GUI definition document 20 is processed by the electronic device 50. The electronic device 50 is responsible for rendering 12 a view of the GUI, including the navigable elements defined in the GUI definition document, according to the layout 21 (operation 12.1). Next, in operation 12.2, the navigation policy to be implemented may be determined from the layout resulting from the rendering operation. For example, where a nearest neighbor policy is implemented, the relative locations of different navigable elements may be determined after rendering, at which point navigation data sets for each of the navigable elements may be established. In other embodiments, e.g., where navigation data sets for the navigable elements have already been established in the GUI definition document, or where the next navigable element is determined dynamically in response to navigation events, operation 12.2 may be omitted.

Next, in operation 12.3, the GUI may be initialized, e.g., by setting and activating a current navigable element, e.g., from a start point defined in the navigation policy (e.g., defined in the GUI definition document). Then, in operation 13, the GUI may be displayed on a display of the electronic device 50.

Furthermore, the electronic device 50 is responsible for navigating (operation 14) from a current navigable element 22 to a next navigable element 22. Therefore, the electronic device 50 receives (e.g., from a keyboard, which may be connected to the electronic device 50 or included in the device 50), a navigation event in operation 14.1. In response to the received navigation event, as illustrated by operation 14.2 or operation 14.3, the electronic device 50 determines the next navigable element, e.g., dynamically (operation 14.2) or based upon stored data (operation 14.3). For example, operation 14.2 may incorporate analyzing the current layout of navigable elements to identify a nearest neighbor in the direction associated with the received navigation event. Operation 14.3, on the other hand, may incorporate accessing the appropriate navigation data set 23 for the current navigable element 22 and received event, e.g., as defined in the GUI definition document during generation, or as determined during initial rendering of the GUI. In some embodiments, therefore, one of operations 14.2 and 14.3 may be omitted. Once the next navigable element 22 is determined, the next navigable element is activated in operation 14.4, e.g., by setting the current navigable element 22 as inactive and setting the next navigable element 22 as active for user interaction.

In further examples, the navigable elements of the GUI together with the navigation data sets represent a state machine, wherein a navigable element represents a state of the state machine and a navigation data set represents a transition (of the state machine) between two of the states.

In further examples, the GUI definition document is represented by an HTML document, wherein the GUI is defined by one or more HTML Layers. Correspondingly, in those examples the GUI is rendered by a web browser processed by the electronic device. The navigable elements are (visible) HTML elements and the navigation data sets of a respective navigable element are represented by HTML attributes of the visible HTML element representing the respective navigable element.

Figure 3:
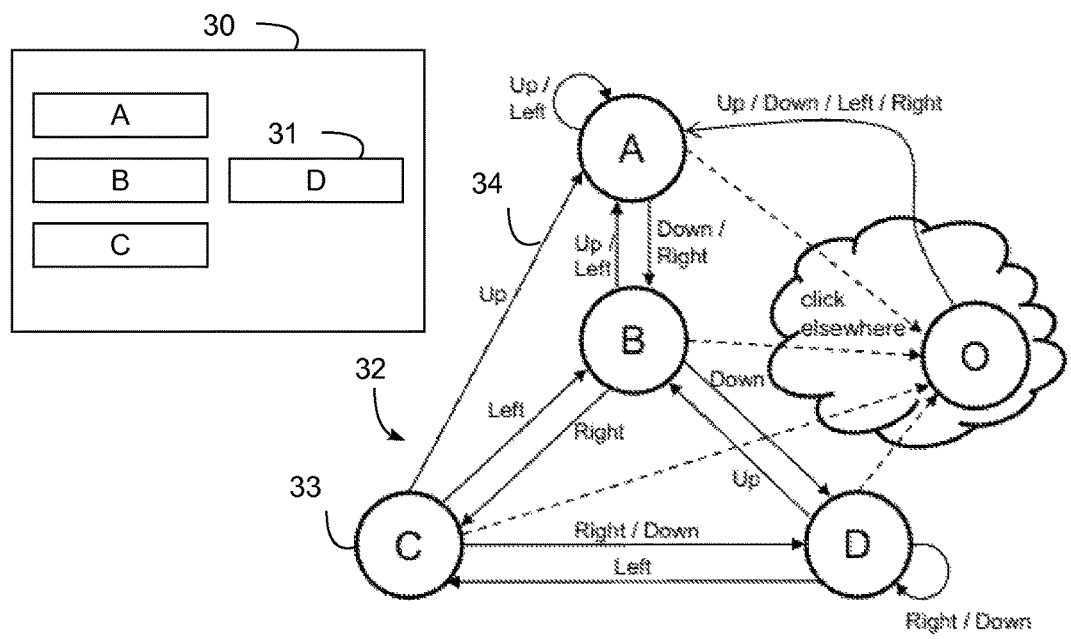
FIG. 3 is a schematic plot of the navigation within navigable elements.

As illustrated in FIG. 3, in further examples, a GUI definition document defines a layout 30 incorporating four HTML elements 31 as navigable elements, wherein each element includes a respective unique ID A, B, C, and D. In some of these examples, the GUI is a state machine, e.g., state machine 32. Correspondingly, the navigable elements A, B, C and D may be considered as states 33 of the state machine 32 and the navigation data sets of the respective navigable elements A, B, C and D may be considered as transitions 34 between the states of the state machine 32. Further ones of these examples distinguish from the present ones in the number of states and/or transitions. Turning back to the examples illustrated in FIG. 3, the transitions are represented by HTML attributes of that respective HTML element, which represents the origin of the transition. The transitions 34 are illustrated by arrows in FIG. 3. Transitions (i.e. the navigation data sets) represent allowed navigations between the HTML elements, wherein a the term "allowed" with regard to navigation, navigation data or navigation event means that the GUI definition document defines a corresponding navigation data set specifying the respective navigation data for the respective navigable element.

In the present example, transitions are triggered by keyboard events as navigation events. The GUI definition document defines in the present example four navigation events, which correspond to keyboard events generated by pressing cursor keys "Up", "Down", "Left" and "Right". Thus, in the present example the GUI defines four allowed navigation events. With regard to navigating within the GUI the method of controlling the GUI ignores other keyboard events than those four allowed navigation events. However, further examples distinguish in that that further or other keyboard events trigger transitions, for example in response to pressing a "Tab", "Page up", "Page Down", "Home" and/or "End" key of the keyboard an allowed navigation event is generated.

Turning back to the examples illustrated in FIG. 3, the GUI definition document further defines as a start ID the value A of the HTML element 31 with the unique ID A.

Thus, when initializing the GUI the HTML element 31 with the unique ID A is initially set as current navigable element and emphasized to signal the user the current element. This is processed by the web browser of the electronic device using JavaScript. To keep track of the current navigable element when navigating through the GUI, a current ID is maintained by JavaScript and updated by the value of the unique ID of the next navigable element each time navigating from the current to the next navigable element.

The navigation through the GUI is exemplary discussed for one navigation activity (i.e. navigating from a current element to a next element) by the example illustrated in FIG. 3. For example, the HTML element 31 with the unique ID A (in short "element A") may be assumed as start point of the exemplary navigation activity (the following correspondingly applies to any other HTML element as start point). Thus, the element A is the current element (which is therefore actually emphasized) and the current ID has the value A. According to FIG. 3, element A allows for four transitions. Therefore, in the GUI definition document there are four navigation data sets defined for the HTML element A, which can be formulated as tuples of a respective navigation event and a corresponding next navigable element: (Up, A), (Down, B), (Left, A), (Right, B). Those tuples are implemented as an HTML attribute of the element A. Element A has exactly one navigation data set per allowed navigation event, wherein for each of the allowed navigation events a corresponding navigation data set is defined. This avoids undefined situations. Since element A is the start point, in response to pressing the cursor key "Down" the electronic device 50 determines the element B as next element by interpreting that navigation data set that corresponds to the navigation event D, which carries the information of the above mentioned tuple (Down, B) for the current element A. Therefore, the element B is (found and consequently) set as the current element, i.e. the element A is set as inactive, the element B is set as active and the current ID is updated to the value B. Furthermore, element B is emphasized, whereas the former current element A is deemphasized. Thus, by pressing the "Down" key, the user can navigate from element A to element B.

As can be further seen by the example tuples above, e.g. the tuple (Left, A), for some navigation events the next navigable element may be identical with the current navigable element. This means that the current element remains the same in response to pressing the cursor key "Left" when starting navigation from element A. From a user's perspective, in this case pressing the key "Left" appears to have no navigation effect if the element A is actually emphasized.

In further examples, the navigation data sets are represented by HTML attributes which are a one-dimensional data array specifying next navigable elements only. In these examples, a navigation data set does not includes any explicitly formulated information about the respective navigation events, but the respective navigation events are implicitly specified by the order of the navigation data sets within the array. For example, the above described navigation data sets formulated as tuples (Up, A), (Down, B), (Left, A), (Right, B) may be coded as list (A, B, A, B). In the present example, the GUI definition document elsewhere defines that the first position within the array represents the next element associated with the navigation event "Down", the second position within the array represents the next element associated with the navigation event "Right" and so on. This may decrease storage and memory consumption required by the GUI definition document and/or reduce processing resources of the electronic device.

In further examples, the HTML elements A through D illustrated in FIG. 3 may be defined in the GUI definition document as illustrated by the following example code fragments:

```
<input type="text" value="" navnext="A,B,A,B" uniqueID="A"
name="element A">
<input type="text" value="" navnext="A,D,A,C" uniqueID="B"
name="element B">
<input type="text" value="" navnext="A,D,B,D" uniqueID="C"
name="element C">
```

```
<input type="text" value="" navnext="B,D,C,D" uniqueID="D"
name="element D">
```

Thus, the elements A through D are HTML input fields, in the present examples. Each element A through D includes a unique ID implemented as HTML attribute "uniqueID" of the HTML element. For specifying the element A as an initial start point for navigation, a start ID may be defined in the body tag of the HTML GUI definition document, for example as <body startID="A">. Navigation data sets are implemented as HTML attributes "navnext", which provide a list of values representing the unique IDs of the respective next elements for its element. Within this list, the first entry specifies the next element in response to a navigation event "Up", the second entry specifies the next element in response to a navigation event "Down", then for "Left" and finally for "Right". The underlying order, which defines for the entries the respective associated navigation event, is defined by a JavaScript method "getNext", which is also included in the HTML GUI definition document:

Navigation.getNext=function (navigationEvent)

The "getNext" method reads the navigation data set stored as HTML attribute "navnext" in the GUI definition document:

```
NavigationDataSet =
Navigation.current.Element.getAttribute('navnext');
nextElementsList = NavigationDataSet.split(",");
```

Then the method "getNext" determines the next element in dependency of the actual navigation event, wherein the respective entry for each navigation event is considered by the JavaScript "switch"-construct. The navigation events represent respective key codes generated by the keyboard when pressing UP, DOWN, LEFT or RIGHT key:

```
switch (navigationEvent) {
    case keycodes.KEY_UP:
        return nextElementsList[1];
    case keycodes.KEY_DOWN:
        return nextElementsList[2];
    case keycodes.KEY_LEFT:
        return nextElementsList[3];
    case keycodes.KEY_RIGHT:
        return nextElementsList[4];
    default:
```

In further examples, navigation events may be based on both mouse events and keyboard events as described before with regard to keyboard events. For example, in response to a mouse click, a navigation event is generated, which includes the current mouse cursor position. Some of these examples may correspond to that examples illustrated in FIG. 3. If the mouse cursor hits one of the HTML elements A, B, C and D within the rendered view of the GUI, then the respective HTML element is set as current element. (Whether the mouse cursor hits an element or not is determined by whether the spatial extent of the respective element within the rendered view of the GUI covers the mouse cursor position included in the navigation event or not, for example.) However, it may happen that the user does not hit a navigable element by clicking the mouse (illustrated by the cloud-symbol "click elsewhere" in FIG. 3). In this case a transition to a state O represented by a non-visible HTML element O is carried out. This means that all (visible) HTML elements A to D will be deemphasized (and set as inactive) and the none-visible HTML element O is set as active (but not emphasized since it is a none-visible element). As illustrated in FIG. 3, starting from state O all allowed navigation events will lead to the initial start point element A. Thus, not hitting any of the HTML elements A to D will set the element A as current navigable element upon receiving the next allowed navigation event.

Figure 4:
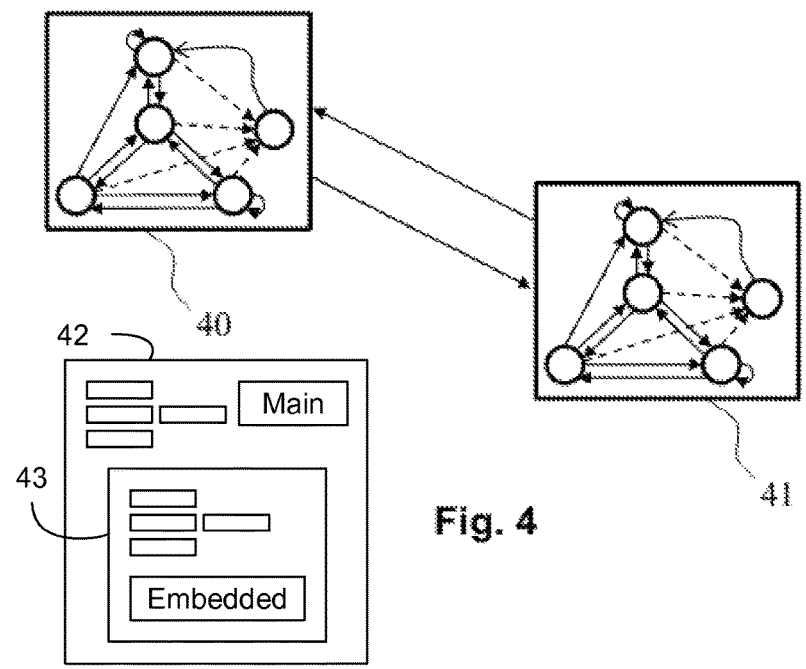
FIG. 4 is a schematic plot of navigation areas.

In further examples, as illustrated in FIG. 4 the GUI definition document defines two navigation areas 40, 41, which are each implemented as an HTML layer. Each navigation area 40, 41 includes a full set of HTML elements as navigable elements as well as its own navigational behavior defined by HTML attributes (representing navigation data sets) of the HTML elements. In general, the method of controlling GUIs with multiple navigation areas may include switching between respective ones of the navigation areas, which effectively results in switching between distinct state machines implemented in the navigation policy. As to the present example, this corresponds to the web browser switching between HTML layers. Switching between HTML layers or navigation areas 40, 41 includes initializing and rendering that HTML layer and navigation area 40, 41 respectively, to which it is switch to. The examples illustrated in FIG. 4 include switching between a first navigation area 40 and a second navigation area 41, wherein the first navigation area 40 represents a main window 42 of the GUI and the second navigation area 41 represents a pop up window 43 of the GUI. When the main window 42 (i.e. the first navigation area 40) is activated, navigation is restricted to HTML elements within the first navigation area 40, whereas navigation is restricted to HTML elements within the second navigation area 41, when the pop up view 43 (i.e. the first navigation area 41) is activated. In the present examples illustrated in FIG. 4, the method of controlling the GUI definition document therefore provides a mechanism to switch between both navigation areas 40, 41, wherein switching is triggered by appropriate navigation area control events other than the navigation events of the navigation areas 40, 41.

FIG. 5 is a diagrammatic representation of the internal structure of an example electronic device 50 which implements at least some of the methods described herein. This structure may also apply to an example client or an example server which are configured to implement the methods described herein.

The electronic device 50 includes at least one processor 51, a main memory 52 and a non-volatile memory 53, e.g. a hard drive, non-removable flash, a solid state drive and/or a removable memory card such as a Micro or Mini SD card, which persistently stores the software enabling electronic device 50 to execute its functions, for example an operating system. Furthermore, the electronic device 50 includes a display 56, a keyboard 57 and, optionally, a cursor input device 58 (such as a mouse). Optionally, an additional I/O interfaces 59 such as card reader and USB interfaces may be present. Optionally, the electronic device 50 includes a network interface 54 (e.g. a wireless network interface such as a Wi-Fi and/or Bluetooth interface) and/or a 2G/3G/4G mobile network interface device. Components 51-54 and 56-59 communicate with each other via a bus 55. It will also be appreciated that the herein-disclosed functionality may also be implemented by multiple computers and/or electronic devices in some embodiments.

The electronic device 50 is arranged to execute a program code 61 stored on a non-transitory computer readable medium 60, to cause it to perform any of the methodologies explained above. For example, the program code 61 may at least include the GUI definition document. An executable set of instructions i.e. the program code 60 embodying any one, or all, of the methodologies described above, resides completely, or at least partially, persistently on a computer readable medium 60, which can be accessed by the electronic device 50 through the I/O interface 59. Optionally, the program code 61 may be additionally or alternatively stored in the non-volatile memory 53. For example, the program code 61 may be copied from the computer readable medium 60 being temporally connected with the electronic device 50 via the I/O interface 59 into the non-volatile memory 53. When being executed, respective process data resides in the main memory 52 and/or the processor 51. As such, in some embodiments, main memory 52 and/or non-volatile memory 53 may also be considered to be a non-transitory computer readable medium. The program code 61 may further be transmitted or received as a propagated signal through the wired or wireless network interface 54 from/to a software server within a local area network or the Internet.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of controlling a graphical user interface (GUI) of an electronic device, comprising:
rendering, by the electronic device, a GUI defined by a GUI definition document, the GUI definition document defining a layout of a plurality of navigable elements, at least one navigation event, and at least one navigation data set per navigable element among the plurality of navigable elements, wherein a navigation data set for a respective navigation event of the at least one navigation event specifies a next one of the plurality of navigable elements to be navigated to in response to the respective navigation event; and
navigating from a current navigable element from among the plurality of navigable elements to a next navigable element among the plurality of navigable elements by:
receiving a received navigation event indicative of an input from a user: and
in response to the received navigation event, determining the next navigable element based on the at least one navigation data set of the current navigable element and setting the current navigable element as inactive such that user input is not passed to the current navigable element and the next navigable element as active for user interaction.

2. The method of claim 1, further comprising emphasizing the next navigable element in response to setting the next navigable element active.

3. The method of claim 1, wherein the at least one navigation event comprises at least one of a key code from a keyboard or a character code from a user input.

4. The method of claim 1, wherein the GUI definition document defines at least 2, 4 or 6 navigation data sets per navigable element, wherein each navigation data set among the data sets of a particular navigable element is unique with regard to the respective navigation event of the navigation data set.

5. The method of claim 4, wherein the at least one navigation event defined by the GUI definition document includes left, right, up and down arrow navigation events, and wherein the GUI definition document defines at least left, right, up and down arrow navigation data sets per navigable element, each of the left, right, up and down arrow navigation data sets respectively specifying a next one of the plurality of navigable elements to be navigated to in response to the left, right, up and down arrow navigation events.

6. The method of claim 1, wherein the GUI definition document defines a unique navigable element identifier for each navigable element among the plurality of navigable elements and a start identifier corresponding to the unique navigable element identifier of a particular one of the plurality of navigable elements, wherein navigating from the current navigable element to the next navigable element includes setting a current navigable element identifier to the value of the unique navigable element identifier of the next navigable element when navigating to the next navigable element, the method further comprising initializing the GUI by setting the current navigable element identifier to the value of the start identifier.

7. The method of claim 1, wherein the GUI definition document comprises an HTML document, wherein the navigable elements are HTML elements, wherein the navigation data sets are represented by HTML attributes of the HTML elements, and wherein rendering the GUI is performed by a web browser resident on the electronic device.

8. The method of claim 7, wherein navigating from the current navigable element to the next navigable element is performed by executing program code embedded in the HTML document with the web browser.

9. The method of claim 8, wherein the program code comprises at least one JavaScript event handler.

10. The method of claim 1, wherein the GUI definition document further defines at least two navigation areas, wherein for each of the at least two navigation areas the GUI definition document defines an area layout and a state machine associated with the respective navigation area, the area layout for rendering the GUI and the state machine implemented by at least a subset of the plurality of navigable elements and navigation data sets defined by the GUI definition document, the method further comprising, in response to switching between the at least two navigation areas, initializing the state machine associated with the selected navigation area among the at least two navigation areas.

11. The method of claim 1, further comprising, in response to a click event generated in response to user selection of a clicked navigable element with a pointing device, setting the current navigable element as inactive and the clicked navigable element as active for user interaction.

12. An electronic device for controlling a graphical user interface (GUI), the electronic device comprising:

at least one processor; and
program code configured upon execution by the at least one processor to:
render a GUI defined by a GUI definition document, the GUI definition document defining a layout of a plurality of navigable elements, at least one navigation event, and at least one navigation data set per navigable element among the plurality of navigable elements, wherein a navigation data set for a respective navigation event of the at least one navigation event specifies a next one of the plurality of navigable elements to be navigated to in response to the respective navigation event; and
navigate from a current navigable element from among the plurality of navigable elements to a next navigable element among the plurality of navigable elements by:
receiving a received navigation event indicative of an input from a user:
in response to the received navigation event, determining the next navigable element based on the at least one navigation data set of the current navigable element; and
setting the current navigable element as inactive such that user input is not passed to the current navigable element and the next navigable element as active for user interaction.

13. A program product comprising:
a non-transitory computer readable medium; and
program code stored on the non-transitory computer readable medium and configured upon execution by at least one processor to control a graphical user interface (GUI) for an electronic device by:
rendering the GUI defined by a GUI definition document, the GUI definition document defining a layout of a plurality of navigable elements, at least one navigation event, and at least one navigation data set per navigable element among the plurality of navigable elements, wherein a navigation data set for a respective navigation event of the at least one navigation event specifies a next one of the plurality of navigable elements to be navigated to in response to the respective navigation event; and
navigating from a current navigable element from among the plurality of navigable elements to a next navigable element among the plurality of navigable elements by:
receiving a received navigation event indicative of an input from a user:
in response to the received navigation event, determining the next navigable element based on the at least one navigation data set of the current navigable element and
setting the current navigable element as inactive such that user input is not passed to the current navigable element and the next navigable element as active for user interaction.

14. A method of generating a graphical user interface (GUI) definition document for display on an electronic device, comprising:
generating a GUI definition document for use in rendering a GUI, the GUI definition document defining a layout of a plurality of navigable elements, at least one navigation event, and at least one navigation data set per navigable element among the plurality of navigable elements, wherein a navigation data set for a respective navigation event of the at least one navigation event specifies a next one of the plurality of navigable elements to be navigated to in response to the respective navigation event; and communicating the GUI definition document to the electronic device such that when the electronic device renders the GUI definition document, the GUI definition document causes the electronic device to navigate from a current navigable element from among the plurality of navigable elements to a next navigable element among the plurality of navigable elements in response to a received navigation event indicative of an input from a user by determining the next navigable element based on the at least one navigation data set of the current navigable element and setting the current navigable element as inactive such that user input is not passed to the current navigable element and the next navigable element as active for user interaction.

15. The method of claim 14, wherein the at least one navigation event comprises at least one of a key code from a keyboard or a character code from a user input, wherein the at least one navigation event defined by the GUI definition document includes left, right, up and down arrow navigation events, and wherein the GUI definition document defines at least left, right, up and down arrow navigation data sets per navigable element, each of the left, right, up and down arrow navigation data sets respectively specifying a next one of the plurality of navigable elements to be navigated to in response to the left, right, up and down arrow navigation events.

16. The method of claim 14, wherein the GUI definition document defines a unique navigable element identifier for each navigable element among the plurality of navigable elements and a start identifier corresponding to the unique navigable element identifier of a particular one of the plurality of navigable elements, wherein the GUI definition document causes the electronic device to navigate from the current navigable element to the next navigable element by setting a current navigable element identifier to the value of the unique navigable element identifier of the next navigable element when navigating to the next navigable element, and wherein the GUI definition document further causes the electronic device to initialize the GUI by setting the current navigable element identifier to the value of the start identifier.

17. The method of claim 14, wherein the GUI definition document comprises an HTML document, wherein the navigable elements are HTML elements, wherein the navigation data sets are represented by HTML attributes of the HTML elements, and wherein the GUI definition document is configured to be processed by a web browser resident on the electronic device.

18. The method of claim 17, wherein the GUI definition document includes JavaScript program code executable by the web browser to cause the electronic device to navigate from the current navigable element to the next navigable element.

19. The method of claim 14, wherein the GUI definition document further defines at least two navigation areas, wherein for each of the at least two navigation areas the GUI definition document defines an area layout and a state machine associated with the respective navigation area, the area layout for rendering the GUI and the state machine implemented by at least a subset of the plurality of navigable elements and navigation data sets defined by the GUI definition document, the GUI definition document further configured to, in response to switching between the at least two navigation areas, cause the electronic device to initialize the state machine associated with the selected navigation area among the at least two navigation areas.

20. An apparatus for generating a graphical user interface (GUI) definition document for display on an electronic device, the apparatus comprising:

at least one processor; and program code configured upon execution by the at least one processor to;

generate a GUI definition document for use in rendering a GUI, the GUI definition document defining a layout of a plurality of navigable elements, at least one navigation event, and at least one navigation data set per navigable element among the plurality of navigable elements, wherein a navigation data set for a respective navigation event of the at least one navigation event specifies a next one of the plurality of navigable elements to be navigated to in response to the respective navigation event; and communicate the GUI definition document to the electronic device such that when the electronic device renders the GUI definition document, the GUI definition document causes the electronic device to navigate from a current navigable element from among the plurality of navigable elements to a next navigable element among the plurality of navigable elements in response to a received navigation event indicative of an input from a user by determining the next navigable element based on the at least one navigation data set of the current navigable element and setting the current navigable element as inactive such that user input is not passed to the current navigable element and the next navigable element as active for user interaction.

* * * * *